United States Patent
Kacmarcik

(10) Patent No.: US 12,340,407 B2
(45) Date of Patent: Jun. 24, 2025

(54) FACILITATING COMMUNICATIONS BETWEEN PARTIES

(71) Applicant: James Kacmarcik, Grafton, WI (US)

(72) Inventor: James Kacmarcik, Grafton, WI (US)

( * ) Notice: Subject to any disclaimer, the term of this patent is extended or adjusted under 35 U.S.C. 154(b) by 204 days.

(21) Appl. No.: 18/053,975

(22) Filed: Nov. 9, 2022

(65) Prior Publication Data

US 2023/0144826 A1     May 11, 2023

Related U.S. Application Data

(60) Provisional application No. 63/277,877, filed on Nov. 10, 2021.

(51) Int. Cl.
*G06Q 30/00* (2023.01)
*G06K 19/06* (2006.01)
*G06Q 30/0601* (2023.01)

(52) U.S. Cl.
CPC ... *G06Q 30/0627* (2013.01); *G06K 19/06037* (2013.01); *G06Q 30/0641* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 2014/0279271 A1* | 9/2014 | Goldman | G06Q 30/0635 705/26.81 |
| 2016/0191434 A1* | 6/2016 | Rice | H04L 51/10 709/204 |
| 2018/0225737 A1* | 8/2018 | Krishan | G06Q 10/083 |
| 2019/0035004 A1* | 1/2019 | Zhang | G06Q 30/0281 |
| 2021/0398196 A1* | 12/2021 | De Troyer | G06Q 20/3276 |

FOREIGN PATENT DOCUMENTS

WO    WO-2018075712 A1 *   4/2018    ......... G06Q 10/0833

OTHER PUBLICATIONS

Rankin, Beth, "Smartphone App Puts You Beyond Bar Code", The Courier, Oct. 26, 2010 (Year: 2010).*

\* cited by examiner

*Primary Examiner* — Ethan D Civan
(74) *Attorney, Agent, or Firm* — Reinhart Boerner Van Deuren s.c.

(57) ABSTRACT

One or more methods or systems of facilitating electronic communications are provided. An initial electronic communication is initiated and then finalized, and subsequently one or more additional communications are generated in response to the initial communication.

20 Claims, 4 Drawing Sheets

FACILITATING COMMUNICATIONS BETWEEN PARTIES

CROSS-REFERENCE TO RELATED PATENT APPLICATION

The present application claims the benefit of and priority to U.S. Provisional Application No. 63/277,877, filed on Nov. 10, 2021, which is incorporated herein by reference in its entirety.

BACKGROUND OF THE INVENTION

The present disclosure is directed generally to electronic communications. The present disclosure relates specifically to facilitating electronic communications between remote parties.

SUMMARY OF THE INVENTION

One embodiment of the invention relates to a method for facilitating communications between parties. The method includes receiving electronic information at a personal electronic device as a result of scanning a portion of a clothing via the personal electronic device. In various exemplary situations the clothing is a sports jersey associated with a sports team. The method further includes initiating electronic communications by the personal electronic device with a central computing device, the central computing device being located at an address identified by the electronic information. The method further includes receiving a first selection at the central computing device, the first selection identifying an item to be purchased. The method further includes receiving a signal at the central computing device indicating that the item has been purchased. The method further includes sending a signal from the central computing device to a second computing device indicating that the purchased item is available to be claimed. The method further includes receiving a signal at the central computing device from the second computing device, the signal indicating that the purchased item has been claimed.

Another embodiment of the invention relates to a method for facilitating communications between parties. The method includes receiving electronic information at a personal electronic device, and initiating electronic communications with a central computing device located at an address identified by the electronic information. The method further includes receiving, at the central computing device, a first selection by a person, the first selection identifying an item to be purchased. The method further includes receiving a signal at the central computing device indicating that the item has been purchased. The method further includes sending a signal, from the central computing device to a second computing device, indicating that the purchased item is available to be claimed. The method further includes receiving a signal, from the second computing device to the central computing device, indicating that the purchased item has been claimed.

Another embodiment of the invention relates to a method for facilitating communications between parties. The method includes receiving electronic information at a personal electronic device as a result of scanning a portion of a clothing via the personal electronic device. The method further includes initiating electronic communications by the personal electronic device with a central computing device, the central computing device being located at an address identified by the electronic information. The method further includes receiving a first selection at the central computing device, the first selection identifying an item to be purchased. The method further includes receiving a second selection at the central computing device, the second selection identifying a location. The method further includes receiving a signal at the central computing device indicating that the item has been purchased. The method further includes sending a signal, from the central computing device to a second computing device at the location, the signal indicating that the purchased item is available to be claimed.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various aspects of a system for facilitating communications are shown. Fans of organizations, such as sports teams, often feel a comradery with other fans of the same sports team. To help sports teams develop that comradery, the present application provides a method of facilitating communications between parties, such as fans of the same sports team.

Fans of s sports team often wear clothing that indicates support for the sports team. For example, fans of a sports team may wear jerseys associated with the team. The present application improves communications between parties by providing a mechanism to facilitate supporters of a team initiating communications and/or providing gifts to each other.

Figure 1:
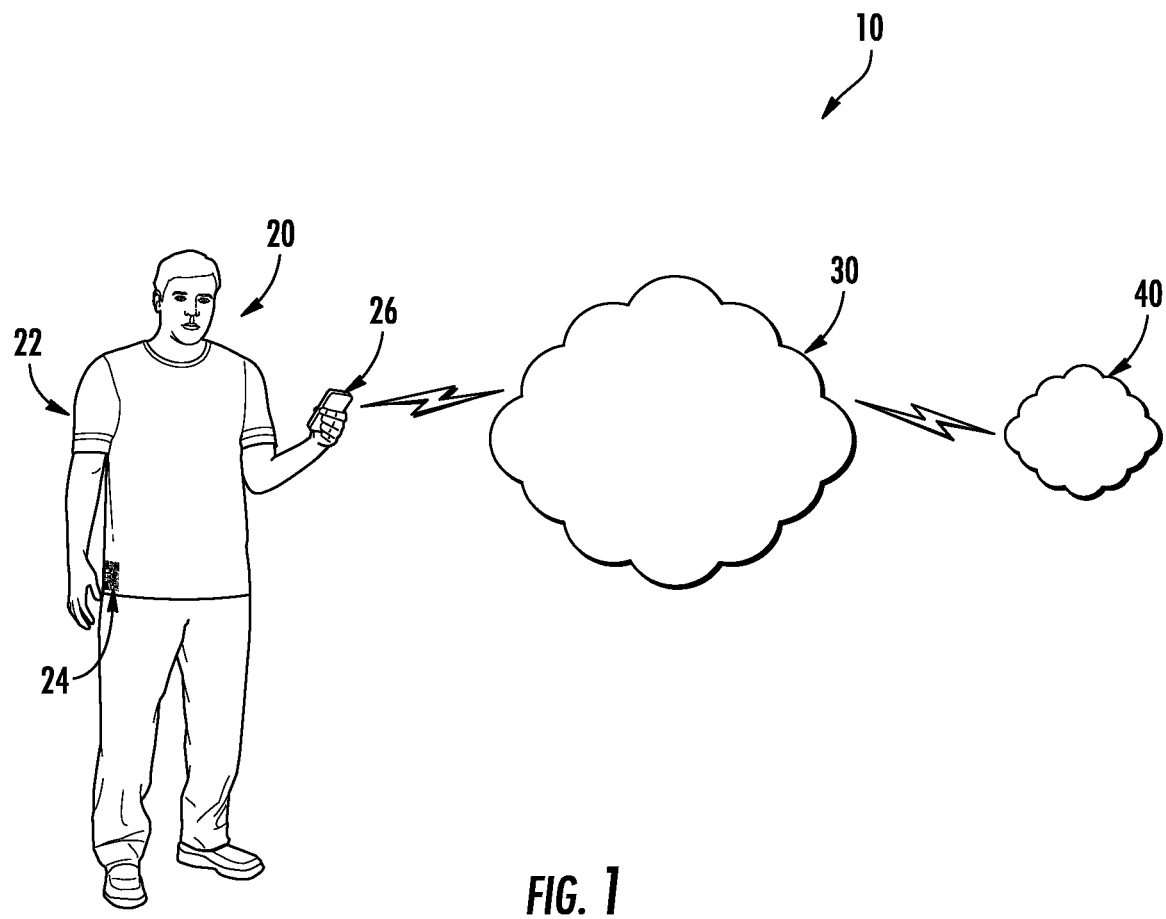
FIG. 1 is a schematic view of a system facilitating communications, according to an exemplary embodiment.
Figure 2:
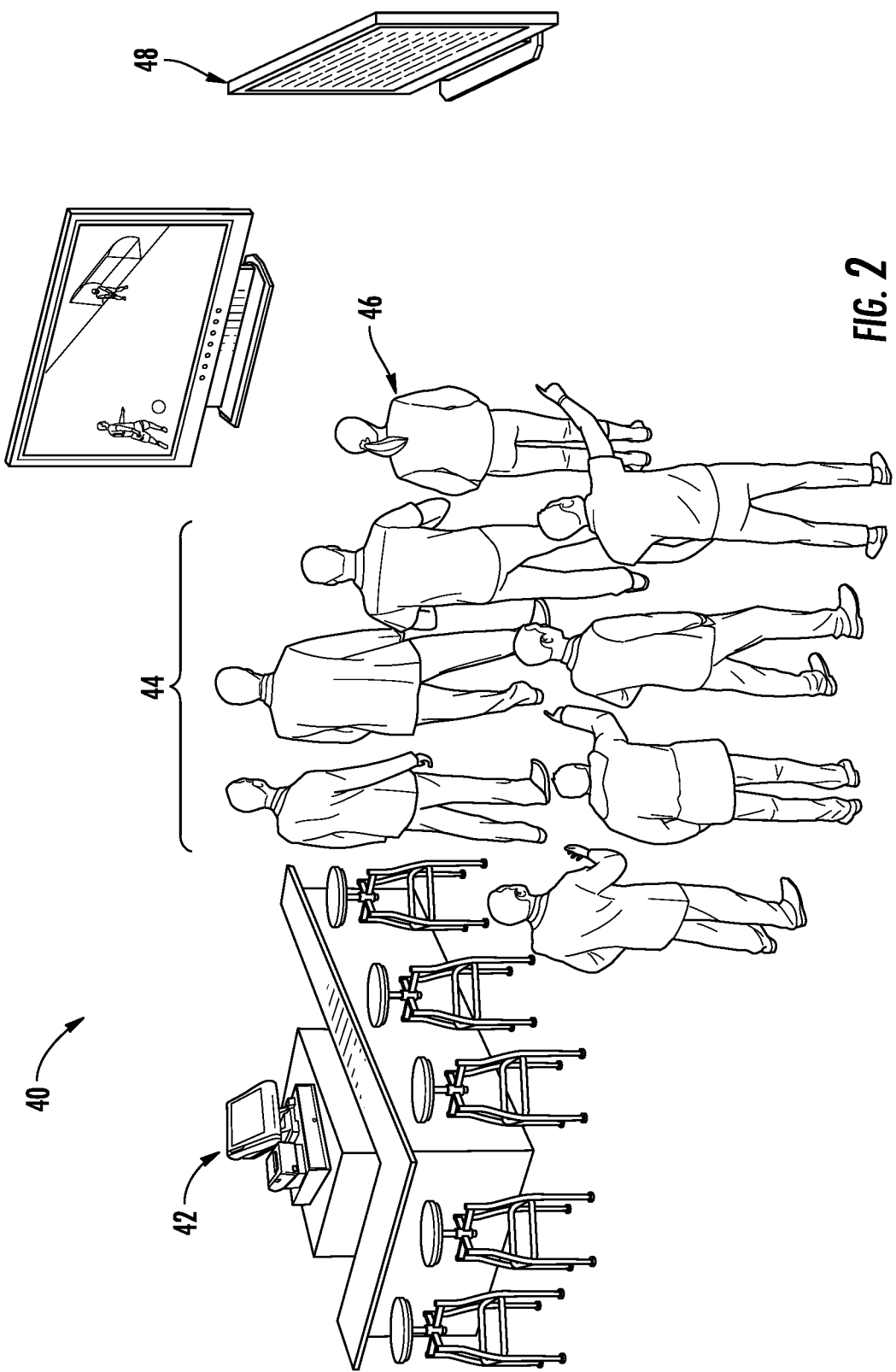
FIG. 2 is an exemplary recipient location of the system of FIG. 1, according to an exemplary embodiment.

Referring to FIGS. 1-2, a system 10 for facilitating communications is provided according to an exemplary embodiment. System 10 includes a first party, such as a first person, shown as initiating person 20 (e.g., a purchaser). In a specific example, initiating person 20 is wearing clothing or clothing accessories, one of which is shown as sports jersey 22.

A portion of sports jersey 22 includes an electronic identification 24. In a specific embodiment, the electronic identification is a QR code. The electronic identification is configured to provide information to a personal electronic device, such as cell phone 26, of initiating person 20. The electronic information includes contact information for a central computing device, shown as central server 30. As will be explained, the personal electronic device of the initiating person 20 communicates with central server 30, and central server 30 communicates with a target location 40.

Referring to FIG. 2, in a specific embodiment target location 40 is an entertainment facility, such as a bar. For example, the bar may be in the home stadium of the sports team associated with jersey 22, and/or the bar may be a location that promotes an allegiance to the sports team associated with jersey 22.

The target location 40 includes one or more devices that communicate with central server, such as a receiving device 42. In a specific embodiment, receiving device 42 is a computing device that communicates with one or more other electronic devices at target location 40 (e.g., output interface 48).

One or more people 44 may be located at the bar watching the sports team on a TV and/or from their seats with a view of the field the sports team is playing on. In various situations, one or more of people 44 are a person 46 (e.g., qualifying recipient) that is wearing a clothing and/or clothing accessory that includes electronic information that corresponds to the electronic information on jersey 22 of initiating person 20. In one example, the correspondence is that the QR code of both jerseys is the same. In another example, the correspondence is that both jerseys relate to the same team. In yet another example, the correspondence is that both QR codes belong to the same group and/or class of QR codes (e.g., the QR codes may be split into groups, such as a different group of QR codes for each type of jersey for a given sports team).

Output interface 48 communicates the purchase made by initiating person 20. For example, output interface 48 identifies the item purchased and the person or people that are qualified to redeem the purchase (e.g., to receive the gift purchased by the initiating person 20). In various embodiments, the item purchased could be a beverage, a food, a piece of clothing (e.g., clothing associated with the sports team), and/or combinations thereof. In a specific example, the people qualified to redeem the purchase are any of people 44. In another example, the people qualified to redeem the purchase are limited to just person(s) 46.

Receiving device 42 and/or central server 30 may communicate with one or more personal electronic devices of people 44 (e.g., their cell phones). In this situation, their cell phones may receive communication (e.g., Wi-Fi, cellular, NFC and/or Bluetooth) from an electronic device in the bar that indicates a gift is eligible for being redeemed.

Figure 3:
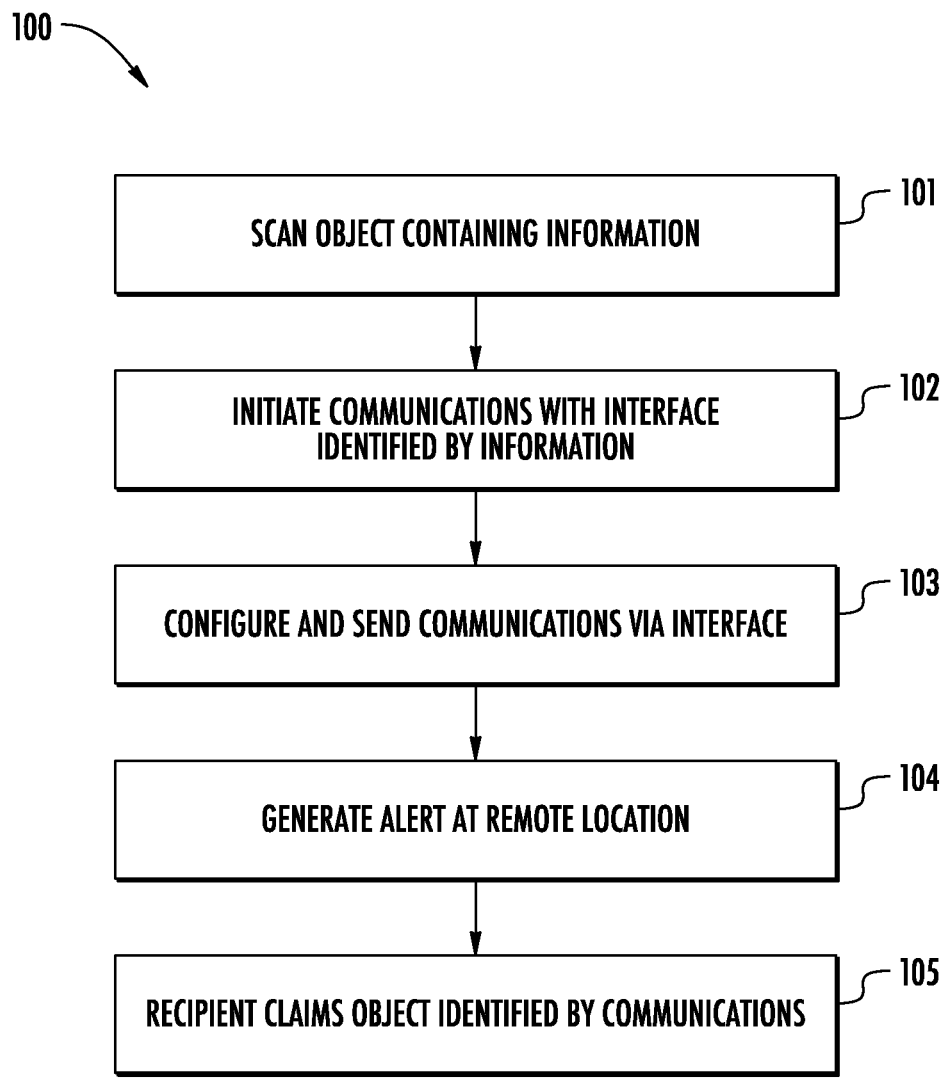
FIG. 3 is an exemplary method of using the system of FIG. 1, according to an exemplary embodiment.
Figure 4:
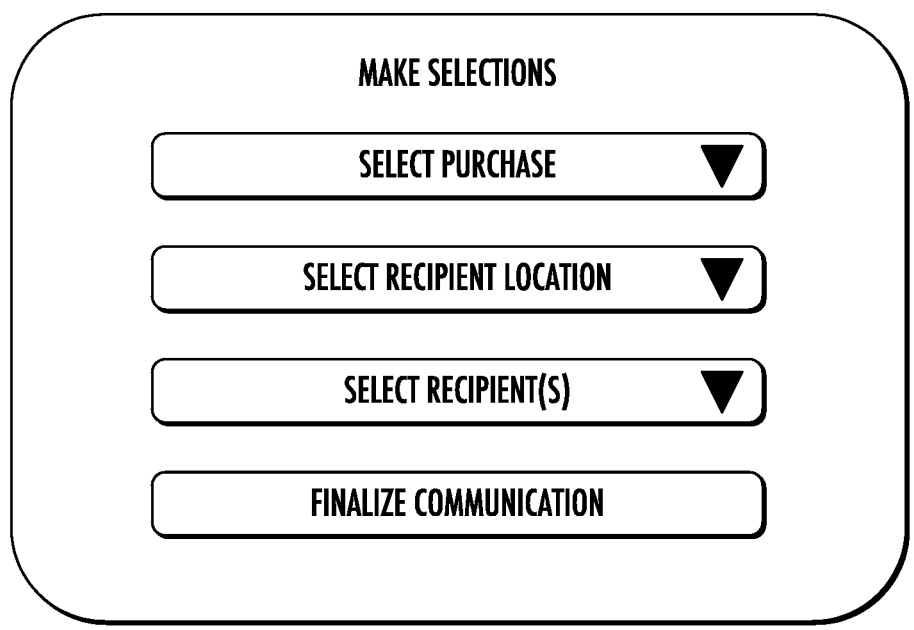
FIG. 4 is an exemplary interface of the system of FIG. 1, according to an exemplary embodiment.

Referring to FIGS. 3-4, shown are various aspects of an exemplary method 100 of using one or more of the systems described herein. Starting at step 101, an object is scanned. In a specific example, the object is a portion of a sports jersey, such as a QR code. The sports jersey is associated with a sports team. In a specific example, the object is scanned by a personal electronic device, such as a cell phone. In one or more embodiments, step 101 involves the initiating person 20 scanning the electronic information of a jersey worn by person 46 or some or all of people 44.

Communications, such as electronic communications, are initiated with a remote computer (step 102). In a specific example, a personal electronic device (e.g., cell phone) initiates electronic communications with a central computer device (e.g., a server) located at an address identified by the electronic information that was scanned. In various embodiments, the address is a computer network address (e.g., an IP address, an IP address and a port).

A person, such as the purchaser, makes selections via an interface provided by the central computing device (step 103). An exemplary interface for making selections and finalizing the subsequent communications can be seen at FIG. 4. Referring to FIG. 4, when finalizing the selections the personal electronic device of the purchaser sends one or more of a first selection identifying a purchased item (e.g., the gift), a second selection identifying a location where the purchased item can be claimed, and/or a third selection identifying one or more recipients eligible to claim the purchased item. In a specific example, the person can select one or more of a gift to be purchased, a location where the purchased gift can be claimed, and/or one or more recipients that are eligible to claim the purchased gift (e.g., recipients wearing a jersey supporting a certain sports team, a type of jersey of the sports team, such as an away jersey). In various examples, the purchased item (e.g., the gift) is one or more of a food and/or beverage, or a beverage, such as an alcoholic beverage.

After completing the selections, the person (e.g., the purchaser) finalizes the communications and submits a payment (step 103). In a specific embodiment, the central computing device receives one or more of the first selection, the second selection, and/or the third selection. In a specific embodiment, when the purchase is approved (e.g., when payment is received), the central computing device receives a signal indicating that the purchased item has been purchased. In a specific embodiment, a second computing device receives a signal, such as from the central computing device, indicating that the purchased item is available to be claimed. In various examples, the second computing device is located at a located selected by the purchaser when making the purchase.

Subsequently, an alert is generated that indicates the purchased item is available to be claimed (step 104). In a specific embodiment, generating the alert includes receiving a signal at an output device (e.g., a display such as a television, e.g., output device 48) from the second computing device, indicating that the purchased item is available to be claimed. Subsequently, the output device generates a signal, such as a visual display, indicating that the purchased item is available to be claimed.

Finally, a recipient claims the purchased item (step 105). In a specific embodiment, a signal is received at the central computing device, such as from the second computing device, the signal indicating that the purchased item has been claimed.

In a specific example, in response to receiving an attempt to claim the purchased item by a claimer (e.g., the recipient) to claim the purchased item, the claimer is required to establish that the claimer is eligible. For example, it must be confirmed that the claimer corresponds to one or more of the recipients identified by the purchaser of the purchased item. In a specific example, confirming the claimer is eligible to receive the purchased item includes receiving second electronic information from the claimer (e.g., via scanning a QR code on a sports jersey worn by the claimer) and comparing the second electronic information to the electronic information initially-received from the purchaser. For example, the purchaser may have identified that only people wearing the same sports jersey as the purchaser are eligible to receive the purchased item. This may be confirmed via the purchaser and the recipient having the same QR code or their QR codes are in the same class or grouping of QR codes.

In various embodiments, the recipient of the purchased gift is provided information that identifies the purchaser of the purchased item, such as contact information of the purchaser (e.g., a phone number, a social media handle).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A method for facilitating communications between parties comprising:
    receiving electronic information at a personal electronic device as a result of scanning a portion of a clothing via the personal electronic device, wherein the clothing is a sports jersey associated with a sports team;
    initiating electronic communications by the personal electronic device with a central computing device, the central computing device located at an address identified by the electronic information;
    receiving a first selection at the central computing device, the first selection identifying a single item to be purchased;
    receiving a signal at the central computing device indicating that the single item has been purchased;
    sending a signal, from the central computing device to a second computing device, indicating that the purchased single item is available to be claimed by a plurality of individuals; and
    receiving a signal at the central computing device from the second computing device, the signal indicating that the purchased single item has been claimed by at least one of the plurality of individuals.

2. The method of claim 1 comprising:
    sending a signal, from the second computing device to an output device, indicating that the purchased single item is available to be claimed; and
    generating a visual display, by the output device, indicating that the purchased single item is available to be claimed.

3. The method of claim 1, wherein the electronic information comprises a QR code.

4. The method of claim 1, comprising:
    receiving a second selection at the central computing device, the second selection identifying the plurality of individuals.

5. The method of claim 4, comprising:
    in response to receiving an attempt by a claimer to claim the purchased item, confirming the claimer corresponds to the plurality of individuals.

6. The method of claim 5, wherein the electronic information is a first electronic information, and wherein the step of confirming the claimer corresponds to the plurality of individuals comprises:
    receiving second electronic information as a result of scanning a portion of a clothing of the claimer; and
    comparing the first electronic information to the second electronic information.

7. The method of claim 1, wherein the purchased item comprises a food and/or beverage.

8. The method of claim 1, wherein the personal electronic device comprises a cell phone.

9. The method of claim 1, wherein the address of the central computing device comprises a computer network address.

10. The method of claim 1 comprising
providing, to a recipient that received the purchased item, contact information that identifies a purchaser of the purchased item.

11. A method for facilitating communications between parties comprising:
receiving electronic information at a personal electronic device;
initiating electronic communications with a central computing device located at an address identified by the electronic information;
receiving, at the central computing device, a first selection by a person, the first selection identifying a single item to be purchased;
receiving a signal at the central computing device indicating that the single item has been purchased;
sending a signal, from the central computing device to a second computing device, indicating that the purchased single item is available to be claimed by a plurality of individuals; and
receiving a signal, from the second computing device to the central computing device, indicating that the purchased single item has been claimed by at least one of the plurality of individuals.

12. The method of claim 11 comprising:
generating a visual display, by an output device, indicating that the purchased item is available to be claimed.

13. The method of claim 11, wherein the electronic information comprises a QR code.

14. The method of claim 11, wherein the purchased item comprises a beverage.

15. The method of claim 11 comprising
providing, to a recipient that received the purchased item, contact information that identifies a purchaser of the purchased item.

16. The method of claim 11 comprising:
receiving a second selection at the central computing device, the second selection identifying the plurality of individuals; and
in response to receiving an attempt by a claimer to claim the purchased item, confirming the claimer corresponds to the plurality of individuals.

17. The method of claim 16, wherein the electronic information is a first electronic information, and wherein the step of confirming the claimer corresponds to the plurality of individuals comprises:
receiving second electronic information corresponding to the claimer; and
comparing the first electronic information to the second electronic information.

18. A method for facilitating communications between parties comprising:
receiving electronic information at a personal electronic device as a result of scanning a portion of a clothing via the personal electronic device;
initiating electronic communications by the personal electronic device with a central computing device, the central computing device located at an address identified by the electronic information;
receiving a first selection at the central computing device, the first selection identifying a single item to be purchased;
receiving a second selection at the central computing device, the second selection identifying a location;
receiving a signal at the central computing device indicating that the single item has been purchased; and
sending a signal, from the central computing device to a second computing device at the location, the signal indicating that the purchased single item is available to be claimed by a plurality of individuals.

19. The method of claim 18, wherein the electronic information comprises a QR code.

20. The method of claim 18, wherein the purchased single item comprises an alcoholic beverage.

* * * * *